July 15, 1924.
J. C. W. HINSHAW
TRAILER TRUCK
Filed July 28, 1922   2 Sheets-Sheet 1
1,501,280
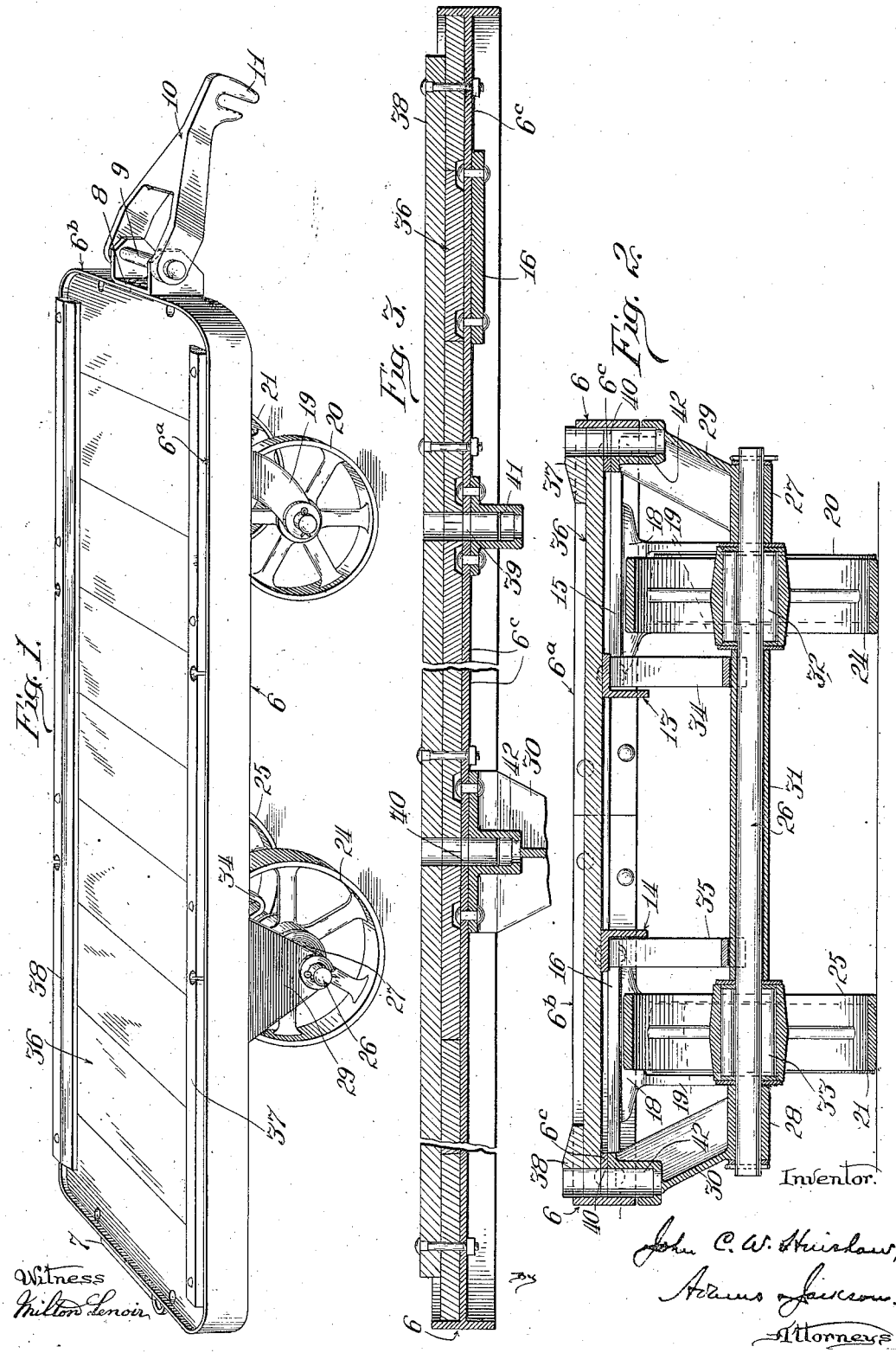

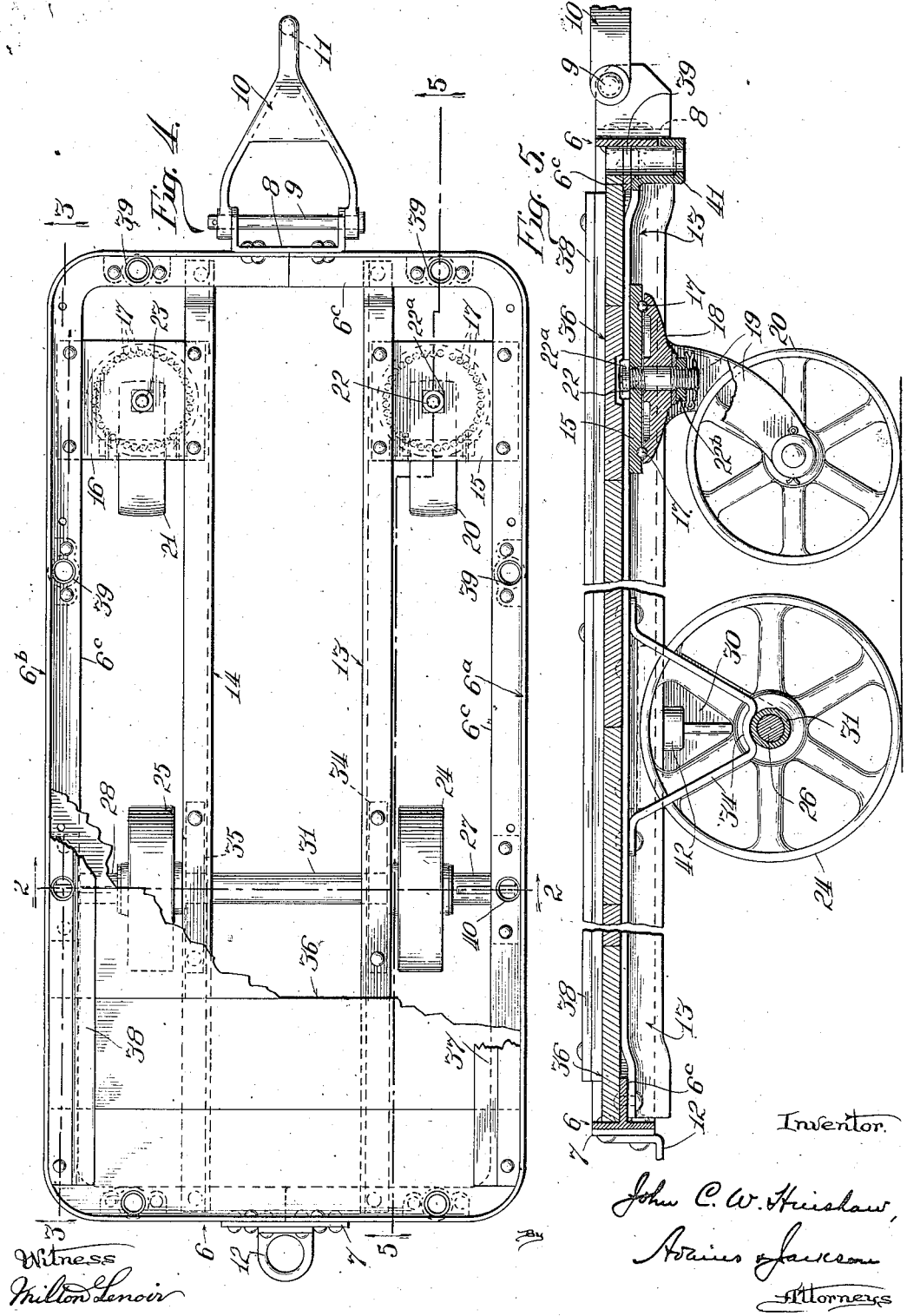

Patented July 15, 1924.

1,501,280

UNITED STATES PATENT OFFICE.

JOHN C. W. HINSHAW, OF CHICAGO, ILLINOIS, ASSIGNOR TO MERCURY MANUFACTURING COMPANY, OF CHICAGO, ILLINOIS, A CORPORATION OF ILLINOIS.

TRAILER TRUCK.

Application filed July 28, 1922. Serial No. 578,095.

REISSUED

*To all whom it may concern:*

Be it known that I, JOHN C. W. HINSHAW, a citizen of the United States, and a resident of Chicago, in the county of Cook and State of Illinois, have invented certain new and useful Improvements in Trailer Trucks, of which the following is a specification, reference being had to the accompanying drawings.

My invention relates particularly to trucks of the type known as trailer trucks, or trucks adapted to be coupled together in series so that they may be drawn by a small tractor, although many of the improved features hereinafter pointed out may be applied to trucks of other types. The object of my invention is to provide certain structural improvements by which the frame of the truck will be made very strong without being unduly heavy, and by which the platform of the truck will be low down while at the same time it will be supported by wheels of comparatively large diameter, thereby making the work of loading and unloading the truck easier, increasing its stability, and making it run more easily, so that less power is required to haul it. Also to provide a construction by which the principal parts of the truck may be assembled in separate halves which may afterwards be easily united so that the parts can be stored, or packed for shipment, more conveniently and with great economy as to space. Other meritorious features of my improved truck will be pointed out in connection with the description thereof. What I regard as new and of my invention will be set forth in the claims.

In the accompanying drawings,—

Fig. 1 is a perspective view of my improved truck;

Fig. 2 is a vertical cross-section thereof on line 2—2 of Fig. 4;

Fig. 3 is an enlarged longitudinal vertical section on line 3—3 of Fig. 4 partly broken away;

Fig. 4 is a plan view, part of the platform being broken away; and

Fig. 5 is a longitudinal vertical section on line 5—5 of Fig. 4 partly broken away.

My improved truck comprises a rectangular frame 6, preferably rounded at the corners, which frame is composed of two U-shaped T iron members 6$^a$, 6$^b$, the end portions of which fit together and are rigidly secured to each other by connecting plates 7, 8 which overlap them and are riveted in place. The connecting plate 8 is preferably U-shaped, as shown in Fig. 4, and supports a bolt 9 by which a yoke 10 is pivotally connected with said plate so as to swing vertically. The yoke 10 is provided with a hook 11, as shown in Fig. 1, for coupling the truck to the rear end of a similar truck. The connecting plate 7 has secured to it a ring plate 12, as shown in Fig. 4, adapted to receive the hook of an adjoining truck for coupling purposes. The end portions of each of the members 6$^a$, 6$^b$ are connected together and braced by longitudinally-extending angle bars 13, 14, as best shown in Figs. 2 and 4, the end portions of said angle bars being deflected downwardly far enough so that they may extend under the horizontal flange 6$^c$ of the T bar member to which they are respectively connected, as best shown in Fig. 5.

Near the forward end of the truck are provided two horizontal plates 15, 16, the plate 15 being connected with the horizontal flange 6$^c$ of the member 6$^a$ and with the horizontal flange of the angle bar 13, while the plate 16 is similarly connected with the member 6$^b$ and the angle bar 14. These plates are provided at their under sides with a circular race way adapted to receive a series of anti-friction balls 17 which are interposed between said plates and circular bearing plates 18 arranged below the plates 15, 16 respectively. The bearing plates 18 are carried at the upper ends of yokes 19 in which are mounted front wheels 20, 21, and said bearing plates are connected with the plates 15, 16 to swing about vertical axes by bolts 22, 23, in the form of rods threaded at both ends and provided with nuts 22$^a$ 22$^b$ above the plates 15, 16 and below the plates 18 respectively. The upper ends of these rods are screwed into the plates 15, 16, so that they are locked firmly in position by the nuts 22$^a$ as shown in Fig. 5. Thus the wheels 20, 21 are in effect caster wheels which adapt themselves to the direction in which the truck is being hauled. The rear portion of the truck is supported by wheels 24, 25 which, as best shown in Fig. 2, are mounted upon an axle 26, the end portions of which are mounted in bearings 27, 28 carried by brackets 29, 30 secured to the members 6$^a$, 6$^b$ at opposite sides of the truck. Between the wheels a spacer sleeve 31 is mounted on the axle 26 to hold the wheels the proper distance apart, and preferably the wheels 24, 25 are provided with roller bearings 32, 33 as shown in Fig. 2. The angle bars 13, 14 are supported over the axle 26 by hangers 34, 35 which are secured to said angle bars and extend downward far enough to bear upon the upper portion of the sleeve 31, as best shown in Figs. 2 and 5.

It will be noted that except for the connecting plates 7, 8, the rear axle and wheels, and the spacer sleeve 31, the truck structure is composed of two similar complementary units, to wit, the members 6ª, 6ᵇ and the duplicate parts attached thereto. In order to complete the truck, therefore, it is necessary only to secure the two halves together, put the rear axle and wheels in place and then apply the platform. My improved truck may, therefore, be left in a "knock down" condition for storage purposes or for shipment, in which condition it occupies less space, is more easily stored, and is less likely to be damaged. No special tools are necessary to assemble the parts, and the work may be done by any ordinary mechanic in a very short time.

The truck is completed by fitting a platform or deck 36 upon the upper surface of the horizontal flange 6ᶜ, as shown in the drawings, and preferably by applying also a pair of longitudinally-extending side strips 37, 38 along the opposite side margins of the frame. These side strips, which are beveled as shown in Fig. 2, serve to tilt the packages placed on the truck slightly toward the center thereof, so that they are not apt to fall off. The use of such strips is well known in the art.

For the purpose of providing means for supporting upright stakes at various points around the margins of the truck, the horizontal flange 6ᶜ is bored at suitable intervals, as shown at 39, 40 in Fig. 1, and registering holes are also provided in the platform. Underneath the holes 39 the flange 6ᶜ is provided with pockets 41 which are riveted thereto, as shown in Fig. 3, and under the holes 40 the brackets 29 are provided with pockets 42. The lower ends of the stakes fit in these pockets 41, 42, so that they are firmly secured in an upright position.

By making the frame of the truck of T bars, and connecting the platform and wheel supports to the horizontal flanges of such T bars, wheels of larger diameter may be used without raising the platform to an undesirable height from the floor, and this is an important advantage in trucks of this description. In fact, in my improved construction I have found it practicable to use 10 inch wheels and still keep the platform no more than 14 inches from the ground. Furthermore, the T bar construction enables me to use lighter material, since the vertical flanges of the T bars strongly resist vertical strains, and the horizontal flange provides adequate support against lateral strains. The longitudinally-extending angle irons support the platform intermediately and further strengthen and support the end portions of the truck, and at the same time they serve to carry the inner margins of the plates 15, 16 which form the upper bearings for the caster wheels.

What I claim as my invention and desire to secure by Letters Patent, is—

1. A truck frame comprising two substantially U-shaped T iron members, longitudinally-extending bars connecting the end portions of each of said members together, and means fixedly connecting said two members together to form a substantially rectangular frame.

2. A truck comprising a substantially rectangular frame, brackets secured to the side members of the frame and having axle bearings and stake receiving pockets carried by said brackets under the side portions of said frame and registering with openings therein.

3. A truck comprising a substantially rectangular T iron frame having stake receiving holes in the horizontal flanges at opposite sides of said frame, brackets secured to said horizontal flanges and having stake receiving pockets adapted to register with said holes, and axle bearings carried by said brackets.

JOHN C. W. HINSHAW.